United States Patent [19]

Miyashita et al.

[11] Patent Number: 4,719,078

[45] Date of Patent: Jan. 12, 1988

[54] METHOD OF SINTERING COMPACTS

[75] Inventors: Tsuneo Miyashita; Hiroaki Nishio; Michitaka Sato, all of Yokohama, Japan

[73] Assignee: Nippon Kokan Kabushiki Kaisha, Tokyo, Japan

[21] Appl. No.: 907,981

[22] Filed: Sep. 16, 1986

[30] Foreign Application Priority Data

Sep. 26, 1985 [JP] Japan .................................. 60-211082

[51] Int. Cl.$^4$ ............................................... B22F 1/00
[52] U.S. Cl. ........................................ 419/53; 419/49; 419/54; 419/57; 264/65; 264/125; 204/164
[58] Field of Search ...................... 419/49, 28, 29, 53, 419/54, 55, 44, 57; 264/65, 125; 204/164

[56] References Cited

U.S. PATENT DOCUMENTS

| | | | |
|---|---|---|---|
| 4,104,782 | 8/1978 | Veeck et al. | 419/49 |
| 4,145,481 | 3/1979 | Gupta et al. | 419/49 |
| 4,212,669 | 7/1980 | Veeck et al. | 419/49 |
| 4,501,717 | 2/1985 | Tsukamoto et al. | 419/57 |

*Primary Examiner*—Stephen J. Lechert, Jr.
*Attorney, Agent, or Firm*—Fleit, Jacobson, Cohn & Price

[57] ABSTRACT

A method of sintering compacts of metals, ceramics and the like in powder form. At least the surface portion of the compact is sintered in a plasma atmosphere having a pressure of 10 Torr or less thereby eliminating the open voids and then the compact is subjected to a hot isostatic press process.

5 Claims, No Drawings

METHOD OF SINTERING COMPACTS

BACKGROUND OF THE INVENTION

1. Field of the Invention

The present invention relates to a method of sintering compacts of powdered metals, ceramics, etc., to produce high-density sinters.

2. Description of the Prior Art

In the past, a hot isostatic press (hereinafter referred to as an HIP) process has been used for producing high-density sinters without any excessively large crystal grains from compacts of metal powders such as hard metal, high-speed steel, tool steel and stainless steel powders, powders of ceramics such as alumina, silicon nitride and silicon carbide and composite powers of hard metals, cermets, etc.

The application of this HIP process requires that a preliminary treatment is performed on the compact such that a high-temperature, high-pressure gas acts effectively in the densification of the compact. The known preliminary processing methods include the metal container process, ceramic mold process, glass bottle capsule process, glass powder capsule process, presintering process and the like and of these known processes the first four processes are not satisfactory from the standpoint of cost and productivity. Thus, the presintering process which presinters the compact so as to change the voids to filled pores in the compact to attain 94% of the theoretical density and then performs the HIP process is usually employed.

The usual presintering is disadvantageous in that a powder compact must be subjected for a long period of time to a temperature at which the growth of crystal grains progresses. The reason is that the sintering extends to the interior of the compact and therefore a high density of over 94% is required for completely filling the voids. There are another disadvantages that the mechanical properties of the sinter are deteriorated by the crystal grain growth and so on.

SUMMARY OF THE INVENTION

The present invention has been made with a view to overcoming the foregoing deficiencies in the prior art and it is the primary object of the invention to provide a method of sintering compacts which is capable of performing a void filling operation in a short period of time while minimizing the growth of the crystal grains during the presintering of a compact of a metal powder, ceramic powder or the like.

To accomplish the above object, in accordance with the invention there is thus provided a compact sintering method which is so designed that when performing an HIP process on a compact produced by compressing for example a metal or ceramic powder into a desired shape, at least the surface portion of the compact is sintered in a plasma atmosphere having a pressure of less than 10 Torr (1332.4 Pa) prior to the sintering.

By sintering the surface portion of the compact in the plasma atmosphere, practically all the open voids in the compact surface portion are filled and moreover this presintering does not require a long period of time thus preventing any excessive growth of the crystal grains.

DETAILED DESCRIPTION OF THE INVENTION

There is no particular limitation to the methods of forming compacts to which the method of this invention is applied. The compact is produced by a variety of forming means such as die pressing, cold isostatic pressing (CIP), injection molding and slip casting.

It is a frequent occurrence that the compact retains such volatile substances as an organic binder, lubricant and moisture. These volatile substances effuse during the plasma treatment that will be described later making the plasma flame unstable or causing the occurrence of misfiring and therefore in the case of the invention it is essential to preliminarily remove such volatile substances fully.

The plasma should preferably be a low-pressure plasma of less than 10 Torr. If a high-pressure plasma is used, not only the gases present in the voids of the compact are sealed by the void filling treatment to remain as defects in the resulting sinter but also a rapid temperature gradient is caused in the plasma flame thereby making it difficult to control the sintering and making it impossible to accomplish the uniform sintering of the compact surface portion.

A suitable plasma working gas is selected in accordance with the kind of compacts to be sintered. In the case of metal powders, it is preferable to use an inert gas, e.g., argon in the form of a single substance or in the combined form with a reducing gas, e.g., $Ar-H_2$. In the case of oxidic ceramics, it is preferable to use an inert gas singly or an oxygen-containing inert gas. In the case of nonoxidic ceramics, the use of a nonoxidizing gas, e.g., argon or nitrogen gas or the use of such nonoxidizing gas in combination with hydrogen gas is suitable.

The generation of the plasma may be effected by either a microwave or a high frequency.

The compact sintering method of the invention is capable of producing high-density sinters and it is a very useful method.

The present invention will be illustrated further by the following examples to clarify its effects.

EXAMPLE 1

Powdered SUS 304L type stainless steel (Cr 18–20%, Ni 9–13%, Mn 2% or less, C 0.3% or less) was formed by a cold isostatic press (CIP) into a cylindrical compact of 10 mm in diameter and 100 mm long. The density of the compact was 83% of the theoretical density. Then, using a torch made by winding a water-cooling copper coil on the outer side of a silica tube having an innner diameter of 100 mm with the compact placed below the silica tube of the torch, a plasma was fired with argon gas by a high-frequency induction of 450 kHz while maintaining a pressure of 1 Torr and the output was adjusted to 15 Kw.

Then, the silica tube of the torch was moved over the compact and brought to a rest when the compact was placed in the plasma flame. After maintaining this condition for 10 minutes, the plasma was extinguished and the compact was left to stand cooling. Then, the compact was taken out. Its density was 89% of the theoretical density.

Then, a hot isostatic press (HIP) process was performed on the compact under the conditions: temperature, 1130° C.; pressure, 1000 $Kg/cm^2$; holding time, 1 hour; and argon gas. It was found that the resulting sinter had a density of 100% as compared with the low density of the compact prior to its processing, i.e., 89% of the theoretical density.

EXAMPLE 2

A raw powder comprising 92 parts by weight of silicon nitride powder having an average particle size of 0.75 μm, 6 parts by weight of yttria and two parts by weight of alumina was wet mixed in acetone in a ball mill and after drying the mixture was compressed by a die press into a cylindrical compact of 5 mm in diameter and 6 mm in height. Its density was 46% of the theoretical density.

Then, using a torch made by winding a water-cooling copper coil on the outside of a silica tube having an inner diameter of 45 mm with the compact placed below the silica tube of the torch, a plasma was fired with a 90% $N_2$–10% $H_2$ gas by a high-frequency induction of 4 MHz while maintaining a pressure of 1 Torr and the output was adjusted to 7 Kw. Then, the silica tube of the torch was moved over the compact and the tube was brought to a rest when the compact was placed in the plasma flame. After holding this condition for 10 minutes, the plasma was extinguished and the compact was left to stand cooling. Then, the compact was taken out. Its density was 58% of the theoretical density.

Then, an HIP process was performed on the compact under the conditions: temperature, 1750° C.; pressure, 2000 Kg/cm², holding time, 1 hour; and hydrogen gas. The result showed that the density after the HIP process was 99% despite the fact that the density before the HIP process was as low as 58%.

We claim:

1. A method of sintering a compact produced by compressing a metal powder, ceramic power or the like comprising the steps of:

pre-sintering only the surface portion of the compact by means of a plasma sintering method wherein only the surface portion of a compact is sintered and the core thereof is left unsintered; and thereafter completely sintering the entire inner portion of the compact by a hot isostatic press process.

2. A method according to claim 1, wherein volatile ingredients in said compact are removed prior to said sintering of a surface portion in a plasma atmosphere.

3. A method according to claim 1, wherein said compact contains a metal powder or powders, and wherein an inert gas alone or a mixed gas of an inert gas and a reducing gas is used as a plasma working gas.

4. A method according to claim 1, wherein said compact contains an oxidic ceramic powder or powders, and wherein an inert gas alone or an oxygen-containing inert gas is used as a plasma working gas.

5. A method according to claim 1, wherein said compact contains a nonoxidic ceramic powder or powders, and wherein a nonoxidizing gas is used as a plasma working gas.

* * * * *

UNITED STATES PATENT AND TRADEMARK OFFICE
CERTIFICATE OF CORRECTION

PATENT NO. : 4,719,078
DATED : January 12, 1988
INVENTOR(S) : T. MIYASHITA et al It is certified that error appears in the above-identified patent and that said Letters Patent is hereby corrected as shown below:

IN THE CLAIMS:

Claim 1, line 2, cancel "power" and insert --powder--.

Signed and Sealed this

Second Day of August, 1988

Attest:

DONALD J. QUIGG

Attesting Officer

Commissioner of Patents and Trademarks